Quiram et al.

United States Patent

[15] 3,661,036
[45] May 9, 1972

[54] VARIABLE SPEED REDUCER

[72] Inventors: Ronald G. Quiram, Michigan City, Ind.; Don W. Eichner, Galesburg, Ill.

[73] Assignee: Outboard Marine Corporation, Waukegan, Ill.

[22] Filed: Oct. 24, 1969

[21] Appl. No.: 869,024

[52] U.S. Cl. ................................................74/800, 74/796
[51] Int. Cl. .........................................................F16h 1/28
[58] Field of Search................74/63, 22, 68, 190, 796, 800

[56] References Cited

UNITED STATES PATENTS

| | | | |
|---|---|---|---|
| 1,153,338 | 9/1915 | Rae | 74/796 |
| 1,330,393 | 2/1920 | Rae | 74/796 |
| 1,495,784 | 5/1924 | Fereday | 74/796 |
| 1,771,807 | 7/1930 | Mitchell | 74/796 |
| 2,490,525 | 12/1949 | Koller | 74/796 |
| 1,904,530 | 4/1933 | Rathbun | 74/63 |

*Primary Examiner*—Martin P. Schwadron
*Assistant Examiner*—Barry Grossman
*Attorney*—John W. Michael, Robert E. Clemency, Gearit I. Foster, Bayard H. Michael, Paul K. Puerner, Joseph G. Gemignani, Andrew O. Riteris and Spencer B. Michael

[57] ABSTRACT

Disclosed herein is a speed reducer or variable speed drive which includes input, output, and intermediate shafts. One end of the intermediate shaft is connected to the output shaft by a universal joint. The other end of the intermediate shaft is received in a transverse slot at the end of the input shaft and is free to move outwardly in the slot from a position in axial alignment with the input shaft in response to centrifugal force upon rotation of the input shaft and thus cause the intermediate shaft to gyrate about the universal joint. The rate of rotation of the output shaft with respect to the input shaft is varied by selective axial movement of a disc which is engageable with a wobble plate secured to the intermediate shaft and which controls the displacement of the other end of the intermediate shaft.

1 Claim, 3 Drawing Figures

PATENTED MAY 9 1972
3,661,036
Fig.1
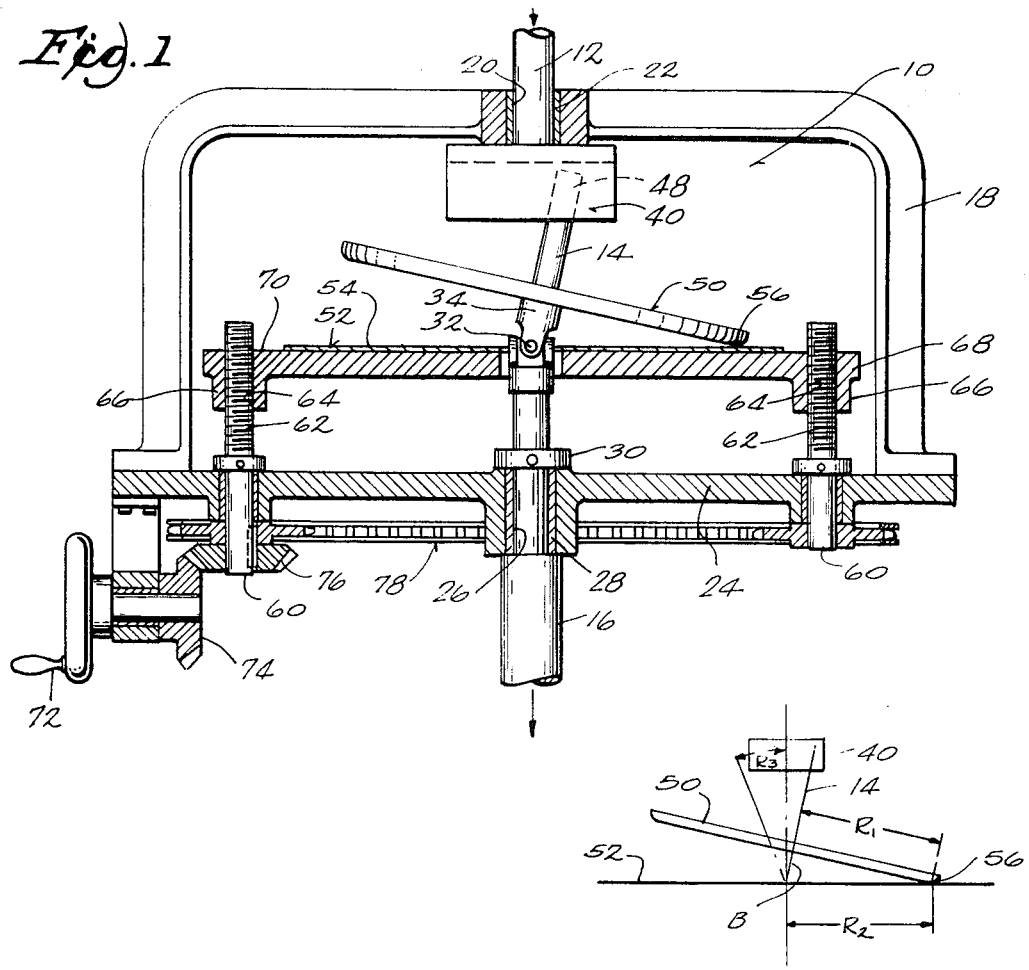
Fig.3
Fig.2
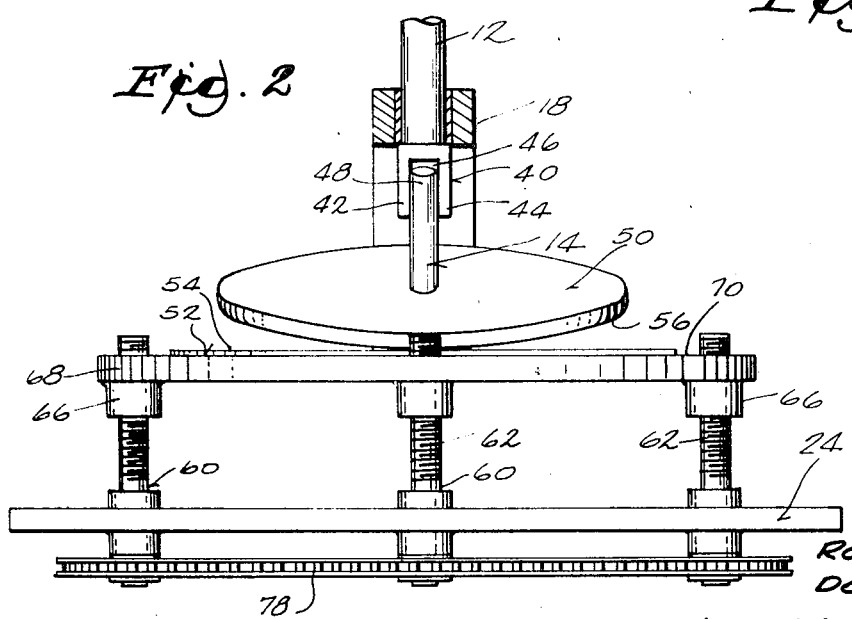
INVENTORS
RONALD G. QUIRAM
DON W. EICHNER
BY Wheeler, Wheeler, House & Clemency
ATTORNEYS

VARIABLE SPEED REDUCER

SUMMARY OF THE INVENTION

The invention provides a variable speed drive for providing an infinite amount of speed variations within a finite speed range. The speed reducer includes an input shaft, an intermediate shaft and an output shaft. The input shaft and output shaft are coaxial. The intermediate shaft is connected at one end to the input shaft by a coupling which affords displacement of the axis of the intermediate shaft relative to the axis of the input shaft. As disclosed, the coupling is in the form of a driver having a pair of opposed members which define a slot which extends transverse to the axis of the input shaft. The slot receives the free end of the intermediate shaft. The other end of the intermediate shaft is connected to the output shaft by a universal joint.

Means are provided for varying the angle of the axis of gyration of the intermediate shaft with respect to the input and output shafts. As disclosed, the means includes a wobble plate which is secured to the intermediate shaft at a point between the ends of the intermediate shaft. The wobble plate is concentric with and perpendicular to the intermediate shaft and is engageable with the surface of a disc or plate provided with a friction surface. Upon rotation of the input shaft, the wobble plate walks around the surface of the plate and the axis of the intermediate shaft travels in a conical path, while at the same time rotation about its own axis, and thereby causing common rotation with the input shaft. The difference in the rate of rotation of the input shaft and the output shaft is due to the difference of radius of the wobble plate as compared with the radius of the circle generated on the disc as the wobble plate walks around the disc.

Means are also provided to move the disc axially of the output shaft to vary the point of engagement of the disc with the periphery of the wobble plate to vary the radius of the circle generated on the disc and thus the rate of rotation of the output shaft with respect to the input shaft.

Further objects and advantages of the invention will become apparent from the following description and accompanying drawings.

DESCRIPTION OF THE DRAWINGS

FIG. 1 is a front elevational view in fragmentary section of the speed reducer of the invention.

FIG. 2 is a fragmentary side elevational view of the device shown in FIG. 1.

FIG. 3 is a schematic diagram of the angles and proportions of various of the components shown in FIG. 1.

DETAILED DESCRIPTION

Referring to the drawing, FIG. 1 discloses a variable speed drive which is in accordance with the invention and which is generally designated 10. The variable speed drive 10 includes a first shaft or input shaft 12, an intermediate or second shaft 14, and an output or third shaft 16. Means are provided for rotatably supporting the input shaft 12 in the form of a frame 18 provided with an aperture 20 and bearings 22. Means are provided for rotatably supporting shaft 16 in coaxial relation with shaft 12. As disclosed, the means is in the form of a cross member 24 which is connected to the frame 18 and which is provided with an aperture 26 and bearing 28. The shaft 16 can be secured in place by one or more collars 30.

In accordance with the invention, means are provided for universally connecting one end of the intermediate shaft 14 to the output shaft 16 to afford gyrating motion of the intermediate shaft 14 upon rotation of the input shaft 12 as will be later explained. As disclosed, the means is in the form of a universal joint 32 connected at the end 34 of shaft 14.

Means are provided for connecting the other end of the intermediate shaft 14 to the input shaft 12 to afford displacement of the axis of the intermediate shaft from the axis of the input shaft and so as to impart the gyrating motion to the intermediate shaft. As disclosed, such means are in the form of a coupling or driver 40 having two parallel opposed spaced wall portions 42 and 44 which extend at right angles to the axis of rotation of the shaft 12 and which define a slot 46 extending transversely to the input shaft and receiving the free end 48 of the intermediate shaft 14.

The invention also provides means for selectively varying the path of gyrating movement of the intermediate shaft or the angle of displacement of the intermediate shaft 14 with respect to the input shaft 12 and thereby to vary the rate of rotation of the output shaft with respect to the input shaft as will hereinafter be explained. In the disclosed construction, such means is in the form of a wobble plate 50 which is connected to the shaft 14 at a point intermediate the ends of shaft 14 and which is concentric with and is in a transverse or perpendicular plane with respect to the axis of the shaft 14. The means also includes a plate or disc 52 which is provided with a friction surface 54 which is engageable with the periphery 56 of the wobble plate during operation of the speed reducer as hereinafter described.

The means for varying the path of gyrating movement also includes means for moving the plate 52 axially of shaft 16 to vary the angular displacement of the intermediate shaft 14 with respect to the axis of the input shaft 12. As disclosed, the means includes four stub shafts 60 which are arranged about the axis of shaft 16 at approximately 90°. Each shaft 60 includes threaded portions 62 which are received in threaded apertures 64 in depending bosses 66 of a plate 68. The upper surface 70 of plate 68 supports the undersurface of the disc 52. The plate 68 can be raised and lowered by a crank 72 connected to one of the shafts 60 by a pair of bevel gears 74 and 76. The shaft 60 with the bevel gear 76 is connected to the other shafts 60 by a chain and sprocket drive generally designated 78.

In operation of the variable speed drive of the invention, rotation of the input shaft 12 causes gyration of the intermediate shaft 14 and due to cooperation of the wobble plate with the friction surface, also causes rotation of the intermediate shaft concurrently with the gyration thereof. More specifically, rotation of the intermediate shaft 14 results in displacement of the axis of the intermediate shaft 14 with respect to the axis of the input shaft. In this regard, the slot 46 in the coupling or driver 40 permits the free end 48 of the intermediate shaft 14 to be displaced from coaxial relation with the input shaft upon rotation of the shaft 14 until the periphery 56 of the wobble plate engages the surface 54 of disc 52. Still more particularly, rotation of the intermediate shaft (as compared to intermediate shaft gyration) and hence rotation of the output shaft occurs in response to gyration of the intermediate shaft because of geometric considerations consequent to engagement of the periphery of the wobble plate with the disc.

As shown in FIG. 3, the wobble plate has a radius $R_1$ which generates a circle having a radius $R_2$ on the surface 54. The radius of the circle $R_2$ is in effect the hypotenuse of a right triangle formed by $R_1$, $R_2$, and B which extends along the axis of the intermediate shaft 14. Since $R_2$ is larger than $R_1$, travel of the wobble plate relative to the disc will cause the intermediate shaft to rotate upon itself while continuing to gyrate. Such rotation of the intermediate shaft is at a lesser rate than the input shaft rotation and because of the universal connection 34, causes concurrent rotation of the output shaft at the same rate as the intermediate shaft, and thereby at a rate less than the input shaft. This difference in rate of rotation is equal to the circumferential length of the wobble plate edge which engages the friction plate divided by the circumferential length of the circle generated by engagement of the wobble plate with the surface 54 minus the circumferential length of the wobble plate edge. As the intermediate shaft 14 gyrates about the universal connection 34, the intermediate shaft travels in a conical path or generates a cone.

The rate of rotation of the output shaft with respect to the input shaft can be varied by the movement of the crank 72 which moves the plate 68 and thus the disc 52 axially with respect to the input and output shafts. Movement of the surface 54 changes the point of the contact of the periphery 56 of the wobble plate with the friction surface 54 and thus changes the radius $R_2$ of the circle generated on the surface 54. Axial movement of the plate 52 also varies the radius $R_3$ of the base of the cone generated as the shaft 14 gyrates about the universal connection 34.

Various of the features of the invention are set forth in the following claims.

What is claimed is:

1. A variable speed drive comprising an input shaft, an intermediate shaft, an output shaft coaxial with said input shaft, means for connecting one end of said intermediate shaft to said input shaft to afford displacement of said one end of the intermediate shaft from the axis of said input shaft, and to cause travel of said one end of said intermediate shaft in a circular path in response to input shaft rotation, means for connecting the other end of said intermediate shaft to said output shaft to afford gyrating motion of said intermediate shaft upon rotation of said input shaft, and means for selectively varying the path of gyration of said intermediate shaft to vary the rate of rotation of said output shaft with respect to said input shaft comprising a wobble plate secured to said intermediate shaft and spaced from the ends of said intermediate shaft and extending in a plane perpendicular to the axis of said intermediate shaft, a disc engageable with said wobble palate, and means for axially moving said disc to vary the displacement of said one end of said intermediate shaft with respect to the axis of said input shaft, said means for axially moving said disc comprising a frame including a cross member having an aperture, a bearing in said aperture for rotatably supporting said output shaft, a plate supporting said disc and including a plurality of threaded bosses, a threaded shaft received in each of said bosses and extending in non-axially movable relation to said cross member, and means for rotating said shafts to move said disc axially of said output shaft.

* * * * *